Jan. 24, 1956  S. T. CARTER  2,731,913
LABEL DATING MECHANISM FOR LABELING MACHINES
Filed April 28, 1951  5 Sheets-Sheet 1

Inventor
Sidney T. Carter
by Roberts Cushman & Grover
Attys

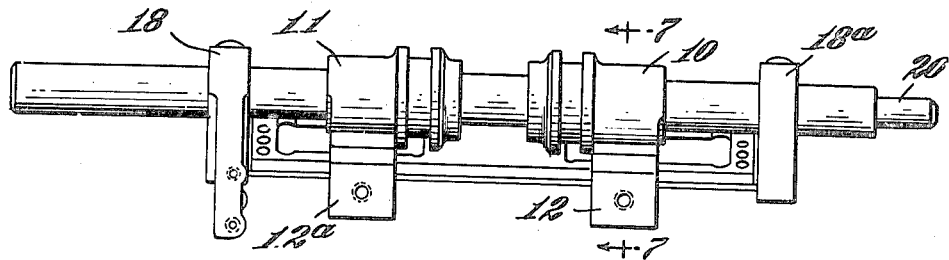
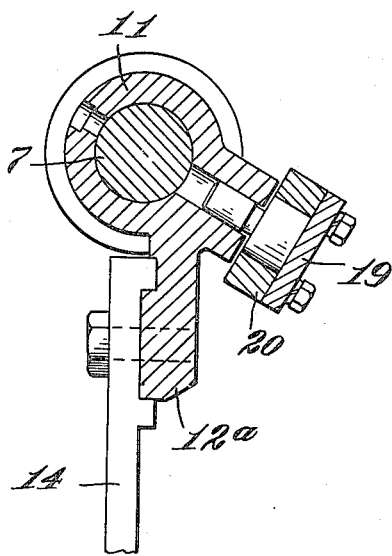
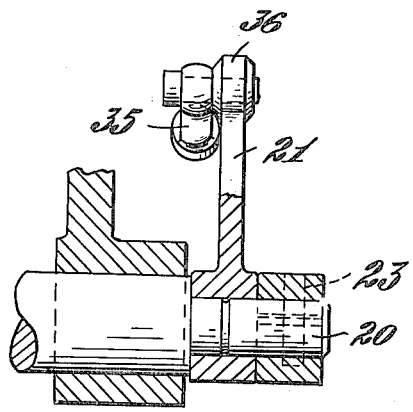
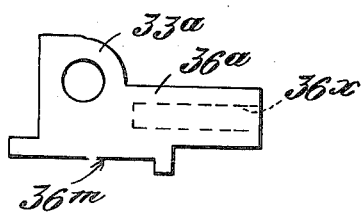
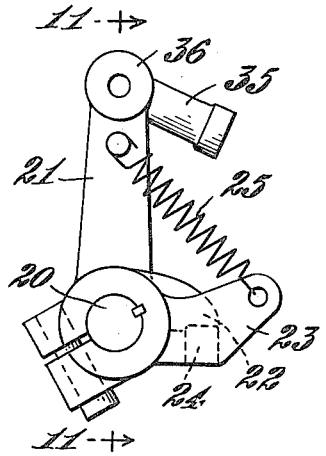

Jan. 24, 1956    S. T. CARTER    2,731,913
LABEL DATING MECHANISM FOR LABELING MACHINES
Filed April 28, 1951    5 Sheets-Sheet 3

Inventor
Sidney T. Carter
by Roberts Cushman Grover
Att'ys

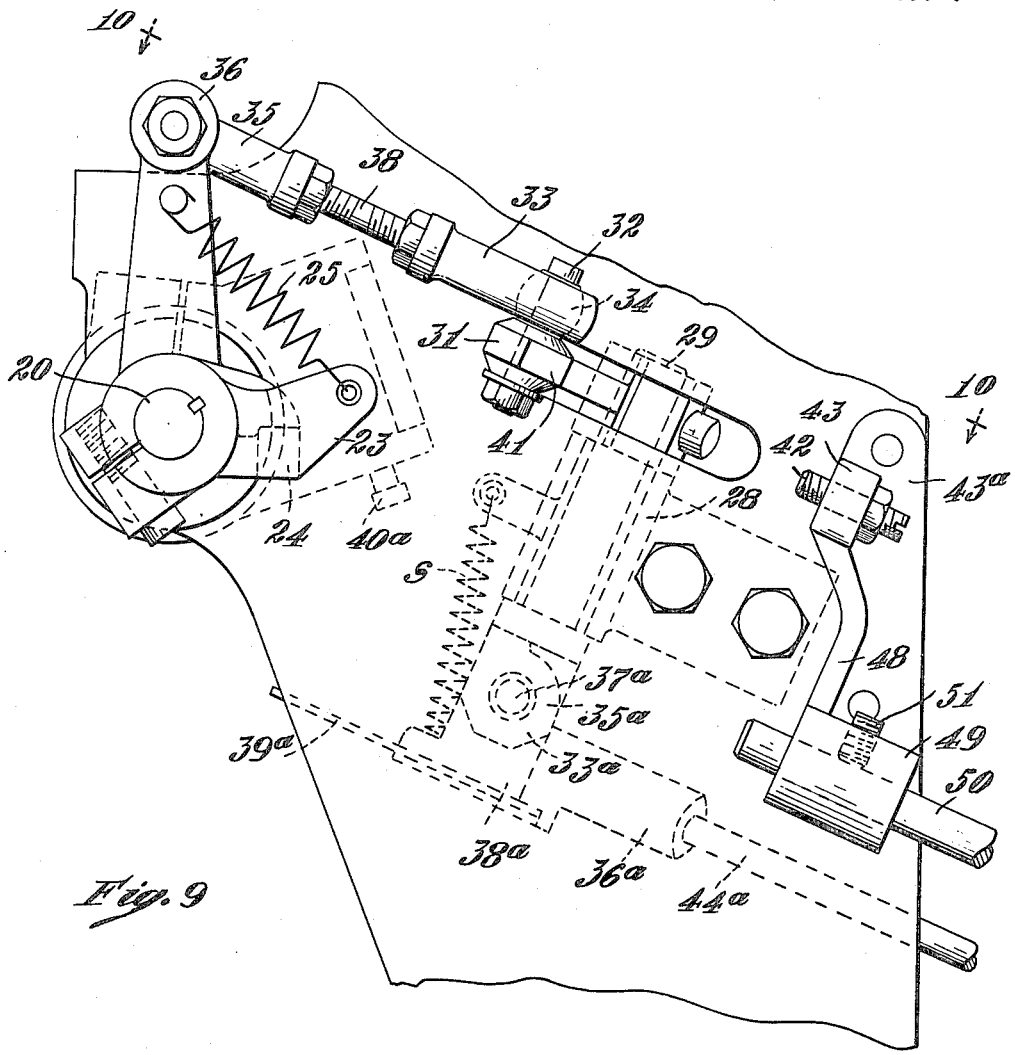

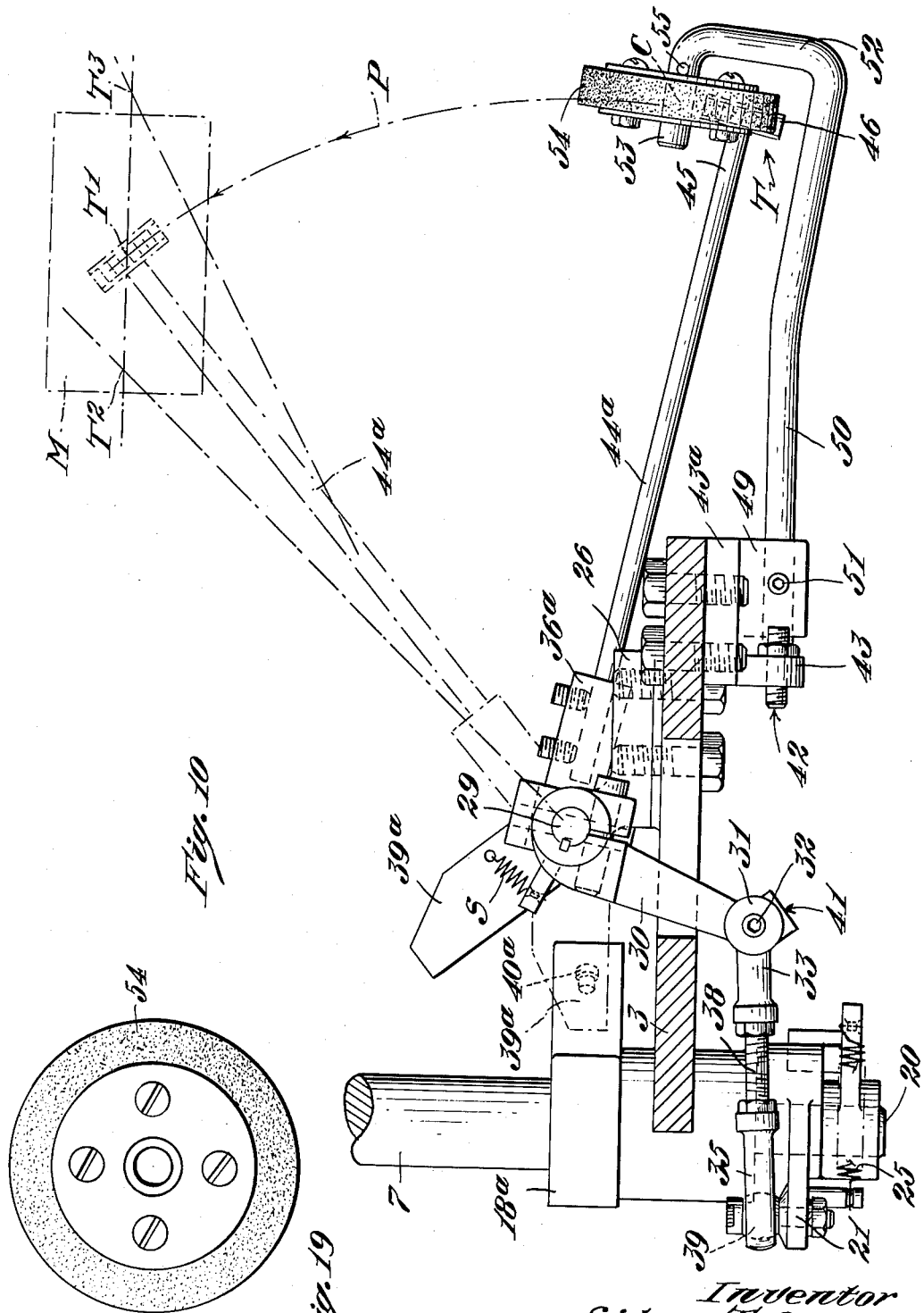

United States Patent Office 2,731,913
Patented Jan. 24, 1956

2,731,913

LABEL DATING MECHANISM FOR LABELING MACHINES

Sidney T. Carter, Worcester, Mass., assignor to Geo. J. Meyer Manufacturing Co., Cudahy, Wis., a corporation of Wisconsin Application April 28, 1951, Serial No. 223,510

9 Claims. (Cl. 101—305)

This invention relates to labeling machines and more especially to an appliance for use in marking the back side of a label while the label is still within the magazine. It has been customary to mark the back of the label with a date, code symbol, emblem or address before the label is applied to the bottle, such marking being visible through the bottle from the opposite side. Usually this marking is done by means of an inked stamp. In some prior labeling machines, the inking of the stamp has involved the employment of three ink rolls and an ink supply reservoir. This is a complicated arrangement and the employment of an open reservoir is wasteful of ink and often results in the spilling of ink, the daubing of the machine, and the spoiling of many labels and involves a difficult cleaning operation at frequent intervals to keep the parts in operative condition. Moreover, in prior devices of this type no provision has usually been made for varying the location of the marking as respects its distance from the bottom of the bottle to which the marked label is affixed. Obviously the marking of the label must be accomplished in the interval between the withdrawal of a label from the magazine by the picker and the return of the picker to take the next label, and this involves a very accurate timing of the parts to avoid interference. Among the objects of the present invention are to provide improved label marking means whereby the application of ink to the stamp is simplified and danger of spilling of ink and daubing of parts is avoided; to provide label-marking means which is readily applicable to a conventional straightaway type of machine without requiring substantial change or modification of the latter; to provide stamping mechanism wherein a stamp is actuated by the shaft which operates the picker, thus to insure accurate timing; and to provide stamping mechanism so designed that the location of the mark on the label can be adjusted relatively to the bottom of the bottle to which the label is affixed. Other and further objects and advantages of the invention will be pointed out in the following more detailed description and by reference to the accompanying drawings wherein Fig. 1 is a fragmentary, diagrammatic, side elevation, partly in transverse, vertical section, showing a portion of the frame of a labeling machine of the straightaway type and showing a bottle at the labeling station and indicating the magazine and also the picker-shaft and its actuating rod, the frame being shown as modified slightly for the attachment of the stamping mechanism of the present invention;

Fig. 6 is a rear elevation of the picker shaft and certain parts carried thereby, to larger scale than Figs. 2 to 5 inclusive;

Fig. 7 is a fragmentary, vertical section, to larger scale, substantially on the line 7—7 of Fig. 6 and showing a picker mounted on one of the picker carriers;

Fig. 9 is a fragmentary elevation, looking from the right-hand end of the picker shaft and showing the parts which support the stamp-carrying arm and the inker element;

Fig. 10 is a plan view of the parts shown in Fig. 9, indicating in full and broken lines respectively, two different positions of the stamp-carrying arm;

Fig. 11 is a fragmentary elevation of the right-hand end of the picker shaft, showing the actuating crank for the stamp-carrying arm and the drive dog in section;

Fig. 12 is an elevation of the parts shown in Fig. 11, looking from the right-hand side of the latter view;

Fig. 18 is an elevation of a hinge member forming a support for the stamp-carrying arm; and Fig. 19 is a side elevation of the inker roll.

For convenience in description, reference is made to the patent to Carter, No. 2,414,019, January 7, 1947, as an example of a labeling machine of the straightaway type employing an adhesive type picker for removing labels from a magazine, the picker being of the separable blade type disclosed, for example, in the patent to Holm, No. 1,901,101, March 14, 1933. Although of broader utility, the marking apparatus of the present invention may be applied very conveniently to existing machines of the above type without substantial changes in the machine construction.

Figure 2:
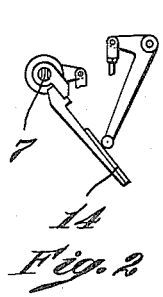
Figs. 2, 3, 4 and 5 are fragmentary, diagrammatic elevations, to small scale, illustrating the cycle of operation of the picker in such a machine.
Figure 3:
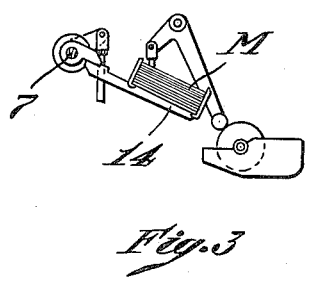
Figures 4, 5:
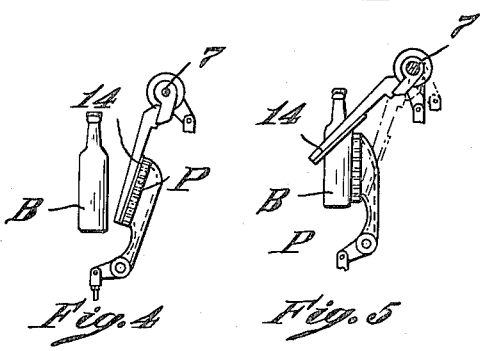

Referring to Figs. 2 to 5 of the drawings the cycle of operation of such a machine, and in particular that of the picker, is diagrammatically illustrated, the picker 14 being carried by the rock shaft 7 and swinging from the glue-receiving position of Fig. 2 to the label-receiving position of Fig. 3 and then back through the label-transfer position of Fig. 4 to the idle position of Fig. 5 while the label is being applied to the bottle B by the transfer pad P.

Figure 1:
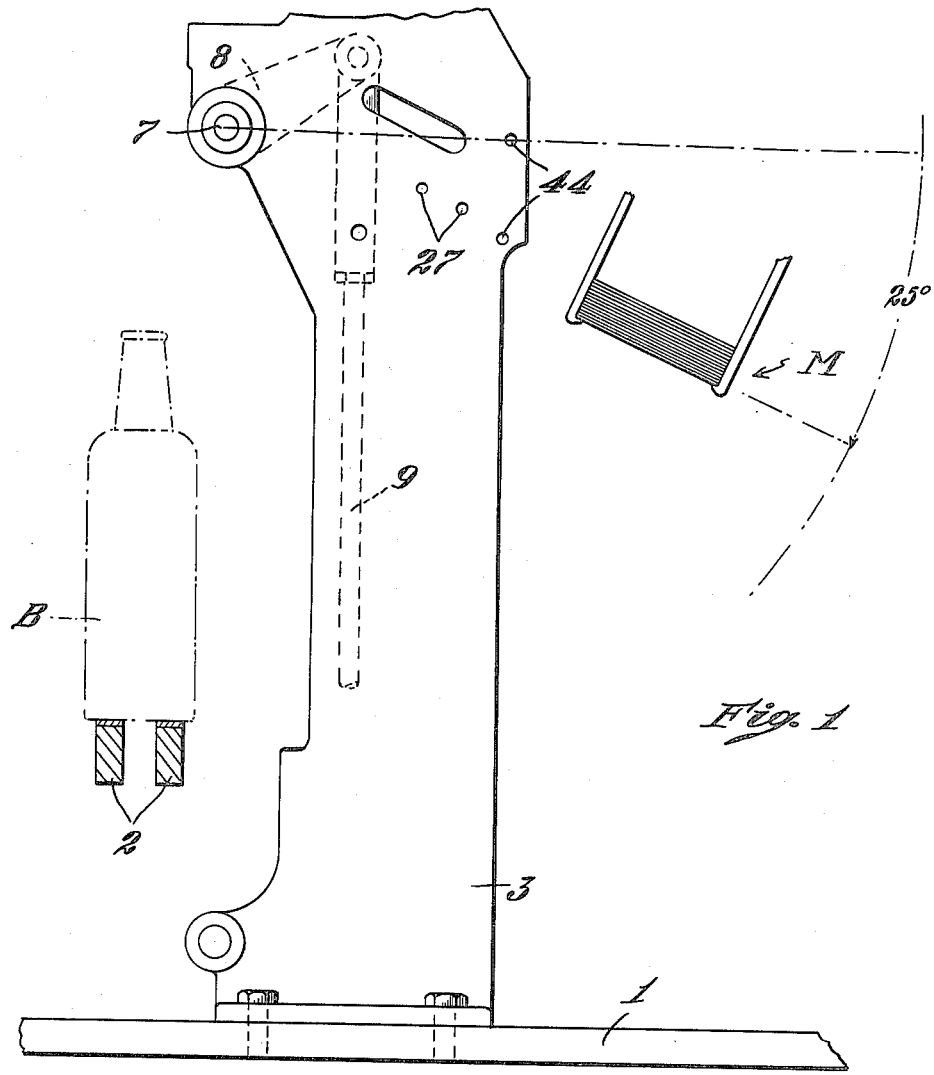

Referring to Fig. 1, the numeral 1 designates the table of a straightaway machine of the above type, the machine having spaced, horizontal guide rails 2 which support the articles, for example bottles B, which are to receive the labels, the articles being moved intermittently along these guide rails by customary means, not shown. The picker takes the label from the magazine M and moves downwardly (Fig. 4) in an arcuate path about the axis of the rock shaft 7, the rock shaft being moved back and forth through an arc of approximately 65° by mechanism including a crank arm 8 (Fig. 1) fixed to the rock shaft, and a connecting rod 9 which extends down through an opening in the table 1, and which is connected to a lever (not shown) which is rocked by a cam on the main shaft of the machine, all in customary manner.

The picker-actuating rock shaft 7 is mounted in bearings carried by uprights 3, mounted on the table 1 (only one of these uprights being here illustrated). As shown more particularly in Figs. 6 and 7, the rock shaft 7 carries a pair of longitudinally slidable sleeves 10 and 11 provided with picker-carrying ears or lugs 12 and 12ᵃ respectively, to which the respective picker blades are rigidly secured, only one of these blades 14 being here illustrated (Fig. 7).

The sleeves 10 and 11 are not keyed directly to the shaft 7 but are connected thereto by means, including spaced arms 18 and 18ᵃ which are keyed to the shaft 7 and from which, by means of appropriate motion-transmitting mechanism, more fully disclosed in the above Carter patent, the sleeves 10 and 11 are properly actuated to move the picker blades toward and from each other while the blades are being swung toward and from the magazine by the rocking of the shaft 7.

Figure 15:
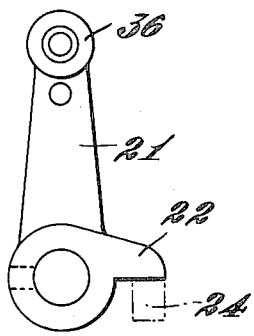
Fig. 15 is a side elevation of the stamp actuating crank which is loosely mounted on one end of the picker actuating rock shaft.
Figure 16:
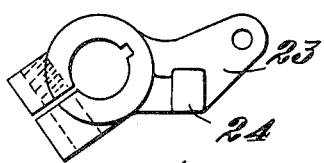
Fig. 16 is a side elevation of the drive dog which is fixed to a picker-actuating rock shaft.

As illustrated in Fig. 6, the rock shaft 7, in accordance with the present invention, is provided with a portion 20 at one end of smaller diameter than the remainder of the shaft. On this small end portion of the shaft 7 there is mounted to turn freely the hub of a crank arm 21 (Figs. 9, 10 and 15) the hub of the crank arm being provided with a radially projecting ear 22. Also mounted on the small end 20 of the rock shaft is the hub of a drive dog 23 (Figs. 9 and 16), this hub being keyed and clamped to the shaft 7 and having a projecting lug 24 which underlies the ear 22 above described. The dog 23 is connected to the crank arm 21 by a tension spring 25 (Figs. 9 and 12) which tends to swing the arm 21 toward the dog 23 and thus normally to keep the parts 22 and 24 in contact.

Figure 17:
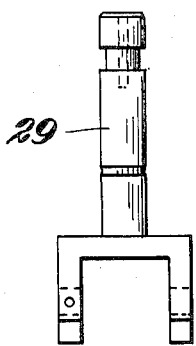
Fig. 17 is an elevation of the swivel shaft to which supports the stamp-carrying arm.

A bracket 26 (Fig. 10) is secured to the inner face of the upright 3 by bolts which pass through openings 27 of the upright 3 provided for the purpose in the upper part of the (Fig. 1). This bracket 26 is provided with a bearing upright 3. This bracket 26 is provided with a bearing portion 28 for the reception of a stamp-actuating swivel shaft 29 (Figs. 9, 10 and 17). Customarily the label magazine M, in machines of this type, is so arranged that the labels are inclined approximately 25° to the horizontal and thus, in order that the stamp may contact the label properly, the stamp supporting arm is desirably inclined 25° to the horizontal. To provide for this condition, the bearing 28 is so arranged that the axis of the shaft 29 is inclined to the vertical, preferably at an angle of approximately 25°. To the upper end of the shaft 29, above the bearing 28 there is keyed the hub of a crank arm 30 (Fig. 10) whose free end portion 31 is provided with a bore for the reception of a pivot pin 32 (Fig. 9) by means of which one end portion 33 of an adjustable connecting rod is pivotally connected to the arm 30. Desirably the part 33 has a spherical socket for the reception of a ball 34 (Fig. 9) through which the pin 32 passes, thus providing a connection of universal type between the parts 33 and 31.

To the upper end 36 (Fig. 9) of the arm 21 there is pivotally secured, preferably by a connection including a ball joint 39 (Fig. 10) the other end portion 35 of the connecting rod. This part 35 is connected to the part 33 by a rotary member 38 having right and left screw threads at its opposite ends respectively which engage threaded bores in the parts 33 and 35 respectively. The parts 33, 35 and 38 thus constitute a connecting rod or link of adjustable length. The part 31 has an abutment surface 41 (Fig. 10) which, at certain times, engages an adjustable stop member 42 (Fig. 10) which is carried by an ear 43 projecting from a bracket 43ᵃ which is secured to the outer surface of the upright frame member 3 by bolts which pass through openings 44 (Fig. 1) provided in the latter for that purpose. By adjustment of the stop member 42 the stamp may easily be centralized with the label.

Figure 8:
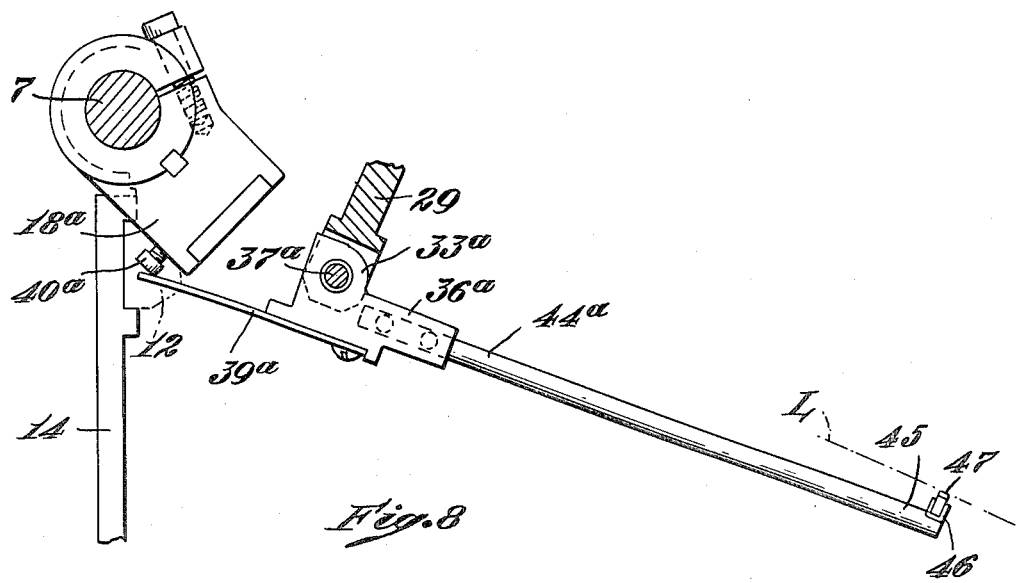
Fig. 8 is a fragmentary, diagrammatic, vertical section, transverse to the picker shaft, indicating one of the pickers and the stamp-supporting arm and parts connected to the latter.

The lower end of the swivel shaft 29 (Fig. 17) is forked to provide spaced arms which receive between them a blade 33ᵃ (Fig. 18) forming part of a hinge member 36ᵃ. The part 33ᵃ is pivotally secured between the forked members 35ᵃ by a pin 37ᵃ (Fig. 9) thus providing a hinge joint between the lower end of the swivel shaft 29 and the member 36ᵃ. The member 36ᵃ has a flat lower surface 36ᵐ (Fig. 18) to which is connected one end of a resilient abutment 39ᵃ (Figs. 8 and 9). This abutment, as here shown, is a flat, resilient arm which lies in the path of an adjustable actuator 40ᵃ (Fig. 8) which has threaded engagement with an opening in the picker actuating member 18ᵃ. When the rock shaft 7 swings sufficiently far to engage the part 40ᵃ with the spring arm 39ᵃ, the latter is depressed, thus swinging the member 36ᵃ in a counterclockwise direction, as viewed in Fig. 8, about the axis of the pin 37ᵃ.

Figure 13:
Fig. 13 is a fragmentary elevation, showing the free end of the stamp-carrying arm with the stamp holder mounted thereon.
Figure 14:
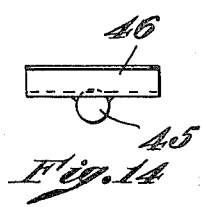
Fig. 14 is an end elevation of the arm shown in Fig. 13, and the stamp holder.

The hinge member 36ᵃ has an elongate bore 36ˣ (Fig. 19) which receives one end of a stamp-supporting rod 44ᵃ, the rod being secured in this bore in the hinge member 36ᵃ by set screws so that the rod is capable of adjustment longitudinally and also rotatively about its own axis. By adjustably rotating the rod in its socket, the face of the stamp may be set to contact the label squarely, to insure good clear printing. Near its free end 45 (Fig. 8), the rod 44ᵃ carries a stamp holder 46 (Figs. 8, 13 and 14) appropriate to hold stamps or types 47 (Fig. 8) of the kind which are to be employed.

The bracket 43ᵃ (Figs. 9 and 10) has a projecting arm 48 which is provided with a boss 49 having a cylindrical bore which receives one end of a rod 50, the rod being capable of longitudinal adjustment within the bore in the part 49 as well as rotational adjustment, and being held in adjusted position by a set screw 51. The free end of this rod is bent to U-shape, as shown at 52, (Fig. 10) having the short leg 53 which constitutes a shaft on which the inking element is mounted to turn freely. Preferably this inking element (Fig. 19) is a roll 54 of firm felt which is absorbent of ink and which rests against a pin 55 projecting from the leg 53. Since the leg 53 inclines upwardly toward its free end, the roll is held thereon by gravity, and may readily be removed for replenishment of its ink, when desired, without the use of tools. By turning the rod 50 in the boss 49, the axis of the roll may be adjusted vertically, and by moving the rod 50 axially in the boss, the roll may be bodily moved horizontally. As illustrated, this roll is of substantial diameter and is so arranged that a plane perpendicular to its axis is substantially tangent, at the point C (Fig. 10) to the arcuate path P along which the stamp holder 46 travels. As indicated in Fig. 10, the path of travel of this stamp holder has one terminus at the point T which is at the opposite side of the vertical plane of the axis of the ink roll 54 from the magazine. By adjustments, hereafter described, its other terminus may be at various points, as indicated at T¹, T², or T³ (Fig. 10). The location of the magazine M, as respects the latter termini of the arcuate path P, is indicated in broken lines in Fig. 10 and it will be noted that because of the possibility of varying the length of the arc P, the application of the marking to the label may be selectively varied as to location, so as to lie near the upper edge of the label or near its lower edge, or in other words at different distances from the bottom of the bottle to which the label is affixed.

In the operation of the device, and assuming that the rock shaft 7 is about to start its clockwise arc of movement from the position of Fig. 3, so as to carry the picker away from the magazine, the movement of the rock shaft will carry the drive dog 23 (Fig. 9) with in a clockwise direction, thus pulling the arm 21 along (with the parts 22 and 24 in contact) and by means of the composite link, comprising the parts 33, 35 and 38, swinging the crank arm 30 (Fig. 10), and thus turning the swivel shaft 29. Such movement of the shaft 29 will swing the stamp-supporting arm 44ᵃ so as to move the holder 46 along the path P. At the start of this movement the stamp 47, carried by the holder 46 will lightly contact the underside of the peripheral surface of the roll 54, thus acquiring a charge of ink and at the same time exerting rotational force on the roll so as to turn the latter slightly. By adjustment of the length of the link (comprising the parts 33, 35 and 38) the length of the path P may be varied and the position of the termini of the path may also be changed by bending the rod 44ᵃ. The radius of this path P may also be varied by adjusting the rod 44ᵃ axially in the bore 36ˣ in part 36ᵃ. When the member 41 engages the adjustable stop member 42, the movement of the arm 30 ceases, although the rock shaft 7 continues to move in the same direction, the parts 22 and 24 separating. This differential motion is permitted by the spring connection at 25 which allows the dog 23 to continue on with the rock shaft while leaving the arm 21 stationary. The adjustment of the stop 42 determines the location of the termini $T^1$, $T^2$, etc. of the path P. While the stamp-carrying arm $44^a$ thus dwells, with the stamp carrier 46 at the proper location (horizontally) beneath the label, the member $40^a$, carried by the part $18^a$, fast to the rock shaft 7, contacts the resilient arm $39^a$ and thus yieldingly swings the hinge member $36^a$ in a counterclockwise direction, as viewed in Figs. 8 and 9, thus swinging the end 45 of the arm $44^a$ upwardly so as to contact the stamp 47 with the label. All of these operations take place as the picker swings away from the magazine. If, for example, it be assumed that the total arc of motion of the picker-actuating shaft 7 is 65°, it is desirable to adjust the parts so that during the first 52° of swing of the picker away from the magazine, the stamp-carrying arm will be moved from the terminus T to the selected termini $T^1$, $T^2$, etc. and during the final arc of 13° of movement of the picker-actuating rock shaft, the arm $44^a$ will be swung up to contact the stamp with the label. However, other divisions of the arc of travel of the picker-actuating shaft, may be desirable, under certain conditions. During the reverse movement of the picker-actuating rock shaft, the arm $44^a$ is first moved downwardly away from the magazine, and then is returned rapidly to its original position at the point T, while the picker is moving past the gum-receiving position to the magazine. As the holder 46 returns, past the roll 55, the stamps carried in the holder again contact the roll, receive a further charge of ink, and again turn the roll, so that a different part of the roll is contacted by the stamp at each cycle of operation.

By the above-described arrangement it is possible to locate the stamp very accurately as respects the label and so to position the face of the stamp relatively to the surface of the label as to insure clearn printing. The inking of the stamp is accomplished by relatively light contact of the stamp with the periphery of the freely turning ink-saturated roll, thus reducing wear to a minimum, and the roll may readily be withdrawn from the part 53, the roll resting against the pin 55 by gravity, so that no tools are required in replacing the roll. This very simple mechanism thus provides for applying a marking to a label at any desired distance from the lower edge of the label, and since the parts move in exact time with the movement of the picker actuating shaft 7, there is no danger that they will interfere with any of the other elements of the labeling mechanism.

While one desirable embodiment of the invention has been illustrated by way of example it is to be understood that the invention is broadly inclusive of any and all modifications which fall within the scope of the appended claims.

I claim:

1. Apparatus for use in marking the exposed face of a label held in a magazine, said apparatus comprising in combination a rock shaft which rocks back and forth through an arc of limited extent, a stamp holder, means supporting the stamp holder to move back and forth in an arcuate path about an axis which is substantially perpendicular to the plane of the exposed face of the label in the magazine, one terminus of said path being such that when the stamp holder arrives at said terminus, it is registered with the label but spaced from the latter, an inking element located adjacent to the other terminus of said arcuate path, means operative to move said holder in timed relation to the rock shaft, so that while approaching and again in receding from the last-named terminus of said path, a stamp, carried by the holder, makes wiping contact with the inking element, and means including a resiliently yieldable part operative to move the stamp holder, while at the first-named terminus of said path, so as to contact a stamp within the holder with the exposed face of the label in the magazine.

2. Apparatus for use in marking the exposed face of a label held in a magazine, said apparatus comprising in combination a rock shaft which rocks back and forth through an arc of limited extent once during each label-marking cycle, a stamp holder for holding a marking stamp, means for moving said holder back and forth in an arcuate path in a plane which is substantially parallel to the exposed face of the label in the magazine, one terminus of said path being directly opposite to but spaced from the label to be marked, a freely rotatable, absorbent roll impregnated with ink spaced from but adjacent to the other terminus of said path, the roll being so located that as the stamp holder is receding from said latter terminus a stamp, within the holder, will engage the peripheral surface of the roll with a component of pressure such as to tend to turn the roll, and means operable by the rock shaft for moving the stamp holder in a direction substantially perpendicular to the aforesaid plane after the stamp holder has arrived at the other terminus of said path, thereby to contact the stamp with the exposed face of the label.

3. Apparatus for use in marking the exposed face of a label held in the magazine, said apparatus comprising in combination a rock shaft which rocks back and forth through an arc of limited extent, means for supporting a stamp holder to move back and forth along a predetermined path which lies in a plane substantially parallel to but spaced from the exposed face of the label in the magazine, one terminus of said path being so located that when the stamp holder is there positioned it is registered with the label in the magazine but spaced from the latter, a freely rotatable ink absorbent roll located adjacent to the other terminus of said path, the axis of said roll being in a plane which is substantially parallel to the plane of said path and so spaced from said path that the path is substantially tangent to the periphery of the roll, means for transmitting motion from the rock shaft to the stamp holder thereby to move the latter along said path, the ink absorbent roll being so located that, as the holder is approaching and receding from the last-named terminus of said path a stamp, carried by the holder, contacts the peripheral surface of the roll and turns the roll, and means operative to move the stamp holder, after the latter arrives at the first-named terminus of its path, thereby to contact a stamp in the holder with the exposed face of the label.

4. In a machine of the class described comprising a movable stamp holder supported to move back and forth along a predetermined path between two termini and stamp inking means operative to apply ink to a stamp mounted in said holder while the latter is moving along said path between said termini, characterized in that the stamp inking means comprises an ink absorbent roll so arranged that its peripheral edge is engaged by a stamp mounted in the holder as the latter moves along said path, and means for supporting the roll comprising an elongate, rigid rod having a crank portion at one end, the axis of the rod proper being substantially parallel to the plane of motion of the holder, the crank portion including a short arm parallel to but spaced from the rod proper and which constitutes a supporting shaft on which the roll is free to turn, said short arm inclining downwardly from its free end whereby the roll is maintained on said arm by gravity alone and may be freely removed from said arm, and means for supporting the rod proper so that it may be adjustably rotated about its own axis thereby to move the periphery of the ink absorbent roll toward or from the path of movement of the stamp holder.

5. Apparatus for use in marking the downwardly exposed face of a label held in the magazine of a labeling machine, said apparatus comprising in combination a rock shaft which rocks back and forth through an arc of limited extent, a stamp supporting arm having a stamp holder at one end, a swivel shaft whose axis is substantially perpendicular to the plane of the exposed face of the stamp in the magazine but which lies in a plane substantially perpendicular to the axis of the rock shaft, hinge means connecting the other end of the arm which carries the stamp holder to the swivel shaft, a crank arm fixed to the swivel shaft, yieldable connections for transmitting motion from the rock shaft to said crank arm, thereby to move the stamp holder along an arcuate path which extends transversely beneath the magazine and which lies in a plane which is substantially parallel to the exposed face of the label in the magazine, means for positively stopping the stamp holder when it reaches a point where it is registered with the magazine and directly beneath the latter, and means actuable by the rock shaft to raise the stamp holder, after it has reached said point, thereby to contact a stamp carried by the holder with the exposed face of the label.

6. Apparatus for use in marking the exposed face of a label held in the magazine of a labeling machine, said apparatus comprising in combination, a rock shaft which rocks back and forth through an arc of limited extent once during each marking cycle, a swivel shaft whose axis is substantially perpendicular to the plane of the exposed surface of the label in the magazine but which lies in a plane perpendicular to the axis of the rock shaft, an elongate stamp supporting arm having a stamp holder at one end, hinge means connecting the other end of said arm to said swivel shaft, bearings for said swivel shaft, a crank arm fixed to said swivel shaft, yieldable connections for transmitting motion from the rock shaft to said crank arm, thereby to move the stamp holder along an arcuate path which lies in a plane substantially parallel to the exposed face of the label in the magazine, an adjustable stop for limiting motion of the stamp holder, the stop being so arranged as positively to stop the holder when it is registered with but spaced from the label in the magazine, a resilient abutment fixed to the stamp carrier arm adjacent to the hinge axis of the latter, and a part which moves with the rock shaft and which is engageable with said resilient abutment, as the rock shaft completes its arc of movement, thereby to swing the stamp carrier toward the magazine.

7. Apparatus for use in marking the exposed face of a label held in the magazine of a labeling machine, said apparatus comprising, in combination, a rock shaft which rocks back and forth through an arc of limited extent, a swivel shaft whose axis is substantially perpendicular to the plane of the exposed face of the label in the magazine and which lies in a plane perpendicular to the axis of the rock shaft, an elongate stamp supporting arm having a stamp holder adjacent to one end, means hinging the other end of the arm to the swivel shaft thereby to permit the arm to swing in an axial plane of said latter shaft, a bearing for the swivel shaft, means for transmitting motion from the rock shaft to the swivel shaft, thereby to move the stamp holder along an arcuate path which lies in a plane substantially parallel to but spaced from the exposed face of the label in the magazine, means adjacent to one end of said path for supplying ink to a stamp carried by the holder, the for supplying ink to a stamp carried by the holder, the other terminus of said path being such that when the stamp holder is there located it is in registry with but spaced from the magazine, and means moving with the rock shaft for moving the stamp carrying arm, after the latter has reached the last-named terminus of said path, so as to contact a stamp carried by the holder with the exposed face of the label.

8. Apparatus for use in marking the exposed face of a label held in a magizne, said apparatus comprising, in combination, a rock shaft which rocks back and forth through an arc of limited extent once during each label marking cycle, the magazine being so arranged that the exposed face of the label is inclined approximately 25° to the horizontal, a swivel shaft whose axis is perpendicular to the plane of the exposed face of the label in the magazine and which lies in a plane substantially perpendicular to the axis of the rock shaft, a stamp supporting arm having a stamp holder adjacent to one end, means hinging the other end of the arm to the swivel shaft thereby to permit said arm to swing in an axial plane of said latter shaft, a bearing for the swivel shaft, means actuated by the rock shaft to turn the swivel shaft thereby to move the stamp holder along an arcuate path, one terminus of which is so located that when the stamp holder is there positioned it is in registry with but spaced from the magazine, there being a stamp inking element adjacent to but spaced from the other terminus of said path, and a part carried by the rock shaft operative to swing the stamp carrying arm about its hinge axis when the stamp holder has been positioned in registry with the magazine, thereby to move the holder so as to contact a stamp carried thereby with the face of the label.

9. Apparatus for use in marking the downwardly exposed face of a label held in the magazine of a labeling machine, the magazine being so arranged that said exposed face is inclined at an angle of approximately 25° to the horizontal, the apparatus comprising, in combination, a rock shaft which rocks back and forth through an arc of limited extent, a swivel shaft whose axis is perpendicular to the plane of the exposed face of the label and which is in a plane perpendicular to the axis of the rock shaft, an elongate stamp supporting arm having a stamp holder at one end, hinge means connecting the other end of said arm to the swivel shaft, bearings for the swivel shaft, a crank arm fixed to said swivel shaft, yieldable connections of adjustably variable length for transmitting motion from the rock shaft to said crank arm, thereby to move the stamp holder along an arcuate path lying in a plane which is parallel to the exposed face of the label in the magazine, an adjustable stop which positively limits motion of the holder in one direction and which stops the latter at a point where the stamp holder is in registry with the magazine before the rock shaft has completed its swing in one direction, a spring abutment fixed to the stamp supporting arm and which projects beyond the hinge axis of the latter in a direction opposite to the length of the arm proper, and an adjustable, rigid contact element carried by the rock shaft and which is engageable with said spring abutment as the rock shaft completes its arc of motion, thereby swinging the stamp supporting arm about its hinge axis to bring the stamp within the stamp holder into contact with the label.

References Cited in the file of this patent

UNITED STATES PATENTS

| | | |
|---|---|---|
| 13,423 | Chamberlain | Aug. 14, 1855 |
| 13,671 | Winder | Oct. 9, 1855 |
| 14,238 | Hatch | Feb. 12, 1856 |
| 18,557 | Smith | Nov. 3, 1857 |
| 146,786 | Soule | Jan. 27, 1874 |
| 1,686,605 | Ermold | Oct. 9, 1928 |
| 1,757,209 | Oslund | May 6, 1930 |
| 2,627,809 | Worth | Feb. 10, 1953 |